(12) United States Patent
Schieder

(10) Patent No.: US 12,515,447 B2
(45) Date of Patent: Jan. 6, 2026

(54) ASSEMBLY FOR PRODUCING A CORRUGATED CARDBOARD WEB LAMINATED ON ONE SIDE

(71) Applicant: BHS Corrugated Maschinen—und Anlagenbau GmbH, Weiherhammer (DE)

(72) Inventor: Sebastian Schieder, Letzau (DE)

(73) Assignee: BHS CORRUGATED MASCHINEN—UND ANLAGENBAU GMBH, Weiherhammer (DE)

( * ) Notice: Subject to any disclaimer, the term of this patent is extended or adjusted under 35 U.S.C. 154(b) by 184 days.

(21) Appl. No.: 18/464,420

(22) Filed: Sep. 11, 2023

(65) Prior Publication Data

US 2024/0083155 A1 Mar. 14, 2024

(30) Foreign Application Priority Data

Sep. 14, 2022 (DE) ..................... 10 2022 209 598.7

(51) Int. Cl.
  *B32B 37/10* (2006.01)
  *B31F 1/28* (2006.01)
  (Continued)

(52) U.S. Cl.
  CPC ........ *B32B 37/1027* (2013.01); *B31F 1/2822* (2013.01); *B31F 1/2868* (2013.01); *B31F 1/2877* (2013.01); *B32B 29/005* (2013.01); *B32B 29/08* (2013.01); *B32B 37/12* (2013.01); *B32B 38/0012* (2013.01); *B32B 2317/127* (2013.01)

(58) Field of Classification Search
  None
  See application file for complete search history.

(56) References Cited

U.S. PATENT DOCUMENTS 10,220,591 B2 * 3/2019 Montagnani ............ B32B 37/12
11,235,549 B2 * 2/2022 Nitta ..................... B31F 1/2804
(Continued)

FOREIGN PATENT DOCUMENTS

DE 3631802 A1 3/1988
DE 102018208522 A1 12/2019
(Continued)

*Primary Examiner* — Barbara J Musser
(74) *Attorney, Agent, or Firm* — McGlew and Tuttle, P.C.

(57) ABSTRACT

An assembly for producing a corrugated cardboard web laminated on one side includes a first corrugating roller and a second corrugating roller for producing a corrugated web. A glue application device applies glue to peaks of the corrugated web and a pressure belt apparatus which in turn includes a pressure belt for pressing a cover sheet against the glued peaks of the corrugated web which rests against the first corrugating roller. The assembly has a pressure belt engaging apparatus including a pressure belt engaging device which engages downwards at the pressure belt during a corrugating roller change to minimize and/or eliminate downwardly sagging of the pressure belt at least adjacent to the pressure belt engaging apparatus, and at least one displacement device in connection with the pressure belt engaging device to displace the pressure belt engaging device between a pressure belt engaging position and an idle position.

24 Claims, 13 Drawing Sheets

(51) Int. Cl.
*B32B 29/00* (2006.01)
*B32B 29/08* (2006.01)
*B32B 37/12* (2006.01)
*B32B 38/00* (2006.01)

(56) References Cited

U.S. PATENT DOCUMENTS

2003/0075263 A1 4/2003 Marschke
2022/0105699 A1 4/2022 Nitta et al.

FOREIGN PATENT DOCUMENTS

EP 0260525 A2 3/1998
EP 3556548 A1 10/2019

\* cited by examiner

ASSEMBLY FOR PRODUCING A CORRUGATED CARDBOARD WEB LAMINATED ON ONE SIDE

CROSS-REFERENCES TO RELATED APPLICATIONS

This application claims the priority of German Patent Application, Serial No. DE 10 2022 209 598.7, filed Sep. 14, 2022, the content of which is incorporated herein by reference in its entirety as if fully set forth herein.

FIELD OF THE INVENTION

The invention relates to an assembly for producing a corrugated cardboard web laminated on one side, in particular an endless corrugated cardboard web.

BACKGROUND OF THE INVENTION

Assemblies for producing corrugated cardboard webs laminated on one side are known from the prior art. When changing corrugating rollers, problems often occur that prolong the downtime of the assembly. In particular, when arranging a new upper corrugating roller or a new complete set of corrugating rollers in the assembly for producing a corrugated cardboard web laminated on one side, it happens again and again that the pressure belt interferes.

SUMMARY OF THE INVENTION

It is an object of the invention to overcome the disadvantages of the prior art. In particular, an assembly for producing a corrugated cardboard web laminated on one side shall be provided which allows a particularly functionally reliable and user-friendly corrugating roller change. The corrugating roller change should also be extremely efficient or quick to carry out.

According to the invention, this object is achieved by an assembly for producing a corrugated cardboard web laminated on one side, with a first corrugating roller and a second corrugating roller for producing a corrugated web having a corrugation, with a glue application device for applying glue to peaks of the corrugation of the corrugated web, with a pressure belt apparatus, which comprises a pressure belt for pressing a cover web against the glued peaks of the corrugated web which rests in regions against the first corrugating roller, and with a pressure belt engaging apparatus, which comprises a pressure belt engaging device which engages the pressure belt during a corrugating roller change to minimize and/or eliminate downwardly sagging of the pressure belt at least adjacent to the pressure belt engaging device, and at least one displacement device in connection with the pressure belt engaging device to displace the pressure belt engaging device between a pressure belt engaging position and an idle position. The essence of the invention is a pressure belt engaging apparatus which, in its pressure belt engaging position, is capable of minimizing or eliminating downward hanging or sagging of the pressure belt during a corrugating roller change at least adjacent to the (active) pressure belt engaging device and thus, in particular, of providing for a necessary (mounting) space for arranging at least one new first corrugating roller or a new set of corrugating rollers in the assembly for producing a corrugated cardboard web laminated on one side. It is convenient if, in the pressure belt engaging position, the pressure belt engaging device is able to push and/or pull the pressure belt upwards or hold it there in an engagement region. In particular, the pressure belt engaging device is able to engage accordingly, preferably directly, when at least one new corrugating roller is arranged at the pressure belt. It is preferably capable of tensioning the pressure belt in the pressure belt engaging position.

It is expedient if the pressure belt engaging apparatus is capable of operating at least partially, preferably completely, automatically. This allows a particularly simple and quick corrugating roller change. Maintenance, repair and/or cleaning of the assembly for producing a corrugated cardboard web laminated on one side are thus simplified. The pressure belt engaging apparatus or its displacement path/distance is preferably settable or adjustable in its angle relative to a horizontal, which allows, for example, an adaptation to different corrugating rollers. Alternatively, the apparatus is immovable or (arranged to be) fixed.

In the pressure belt engaging position, the pressure belt engaging device preferably engages the pressure belt over at least one width region, preferably over the entire width. For example, it is rigid at least in the pressure belt engaging position. The pressure belt engaging device is preferably elongated and preferably extends in a straight manner. For example, it comprises at least one pressure belt engaging element, such as a pressure belt engaging bar, pressure belt engaging strip, pressure belt engaging rope or the like. The at least one pressure belt engaging element has, for example, a round or angular, such as rectangular, outer contour. Advantageously, the displacement of the pressure belt engaging device is guided. It is expedient if the pressure belt engaging device is steplessly displaceable. For example, a length of a displacement path or a displacement distance can be influenced or predetermined. For example, an engagement force of the pressure belt engaging device at the pressure belt is adjustable or predeterminable. In the idle position, the pressure belt engaging device is arranged at a distance from the pressure belt.

The pressure belt engaging device and the at least one displacement device are directly or indirectly connected to each other. For example, there is a rigid or articulated connection between them. It is useful if the pressure belt engaging device is connected to a displacement device at each of its ends.

The at least one displacement device comprises, for example, a displacement drive, which is preferably designed as an electric, pneumatic and/or hydraulic displacement drive. The pressure belt engaging device can also be operated by hand or manually. The at least one displacement device is then designed accordingly.

The corrugating rollers are preferably arranged in pairs. They preferably form a set of corrugating rollers. The corrugating rollers are mounted so that they can be rotated or driven in rotation in a corrugating position and form a corrugating gap for producing the corrugated web. They can be changed individually, preferably together. It is useful if the first corrugating roller forms an upper corrugating roller and the second corrugating roller forms a lower corrugating roller.

The pressure belt apparatus preferably comprises at least two deflection rollers around which the, advantageously endless, pressure belt is guided. The pressure belt preferably has a uniform width in its width or transverse direction. It can be driven on the circumference. It is made of a metal material, for example. Alternatively, the pressure belt is made of plastic or a flexible material such as rubber. It is useful if at least one deflection roller can be tilted to change the course of the pressure belt in its width direction and/or can be displaced in its distance from the other deflection roller to change the tension of the pressure belt.

The glue application device has, for example, a glue tray and a glue application roller for applying glue from the glue tray to the corrugated web. Furthermore, the glue application device preferably has at least one glue dosing roller or glue squeezing roller associated with the glue application roller for dosed glue application.

Further advantageous embodiments of the invention are set forth hereinafter.

The embodiments in which said at least one displacement device is capable to linearly displace said pressure belt engaging device between said pressure belt engaging position and the idle position, and in which the at least one displacement device is designed as linear displacement device and is preferably variable in its length result in a particularly simple and functionally reliable pressure belt engaging apparatus. The at least one displacement device is designed, for example, as a cylinder-piston displacement device, spindle displacement device or the like. It is telescopic, for example. It is advantageous if the pressure belt engaging device can be displaced perpendicularly to its longitudinal extension or longitudinal axis. It is preferably displaceable at an angle or perpendicularly to a horizontal.

The embodiment in which the pressure belt engaging apparatus is arranged, in particular completely, outside the pressure belt apparatus allows trouble-free operation of the pressure belt apparatus. The pressure belt apparatus can thus be designed to be comparatively simple. Advantageously, the pressure belt engaging apparatus is completely arranged outside the pressure belt apparatus. It is preferably located completely outside a space which is enclosed or spatially bounded by the pressure belt. It is expedient if the pressure belt engaging apparatus is arranged at least partially, preferably completely, below the pressure belt apparatus, in particular below an adjacently arranged deflection roller of the pressure belt apparatus, in particular when the pressure belt engaging device is in its idle position.

The assembly in which the pressure belt engaging device in its pressure belt engaging position engages a lower belt of the pressure belt from below is particularly fail-safe. The pressure belt engaging device engages the pressure belt in particular from below and outside between the deflection rollers, i.e. in particular in a region where the lower belt of the pressure belt normally hangs down or sags during a corrugating roller change due to the then missing first corrugating roller. It thus preferably engages at a distance from an upper belt of the pressure belt. A comparatively simple shifting of the lower belt from the bottom to the top or holding the lower belt at the top is possible there.

The embodiment in which during a corrugating roller change at least the first corrugating roller is lowered relative to an active corrugating position again allows a particularly simple corrugating roller change. Interference between the first corrugating roller and the pressure belt apparatus can thus be minimized or eliminated. It is useful if the first and second corrugating rollers are changed together during a corrugating roller change. The assembly for producing a corrugated cardboard web laminated on one side preferably comprises a corresponding lifting device for lowering at least the first corrugating roller, preferably the first and second corrugating roller, relative to an active corrugating position.

The embodiment in which at least one glue application roller of the glue application device is displaceable relative to the first corrugating roller and is arranged offset relative to an active glue application position during a corrugating roller change also allows a trouble-free change of the first corrugating roller, preferably the first and second corrugating roller. It is expedient if the glue application device in its entirety can be displaced or reset accordingly. Advantageously, the assembly for producing a corrugated cardboard web laminated on one side has a corresponding guiding or displacement device.

The embodiment in which the pressure belt engaging apparatus is arranged at the glue application device, in particular at a glue tray and/or a glue application device housing thereof, results in a pressure belt engaging apparatus which is particularly functionally reliable. When the pressure belt engaging device engages the pressure belt from the glue application device, particularly advantageous engagement force ratios are present.

The angle between 2° and 20°, preferably between 4° and 10°, between 10° and 40°, preferably between 15° and 35° or between 50° and 80°, preferably between 55° and 75° with respect to a horizontal, enclosed by the displacement trajectory described by the pressure belt engaging device upon displacement between the pressure belt engaging position and the idle position, is preferably adjustable, such as manually and/or by means of an actuator, which is for example implemented as an electric, pneumatic and/or hydraulic actuator.

The embodiments in which the pressure belt engaging apparatus is arranged adjacent to the glue application device at the assembly frame and in which the pressure belt engaging apparatus is arranged at second corrugating roller level at the assembly frame, and in particular on a side of the second corrugating roller facing away from the glue application device at the assembly frame, also result in favorable engagement force ratios when the pressure belt engaging device engages the pressure belt from the assembly frame.

The corrugating roller changing apparatus according to the invention results in a particularly user-friendly and efficient assembly for producing a corrugated cardboard web laminated on one side. For example, at least the first corrugating roller can be changed using the corrugating roller changing apparatus. Preferably, the first and second corrugating rollers can be changed together using the corrugating roller changing apparatus. It is useful if the corrugating roller changing apparatus comprises a corrugating roller magazine or a corrugating roller cartridge which is displaceable, in particular in a guided manner, between a corrugating roller operating position, i.e. corrugating position, and a corrugating roller storage position and is capable of accommodating at least one corrugating roller to be changed. The corrugating roller storage position can be located inside or outside the assembly for producing a corrugated cardboard web laminated on one side. The corrugating roller changing apparatus ensures space-saving storage of at least one additional corrugating roller. A fast, standardized and therefore easily reproducible exchange of at least one corrugating roller is guaranteed. The set-up time is particularly low. The corrugating roller changing apparatus preferably comprises at least one changing drive. The latter can be configured to be manual or motor-driven.

In the following, preferred embodiments of the invention are described by way of example with reference to the attached drawing.

BRIEF DESCRIPTION OF THE DRAWING

FIG. 3A shows an enlarged view of FIG. 3, which schematically shows a produced corrugated cardboard web laminated on one side.

DESCRIPTION OF THE PREFERRED EMBODIMENTS

Figure 1:
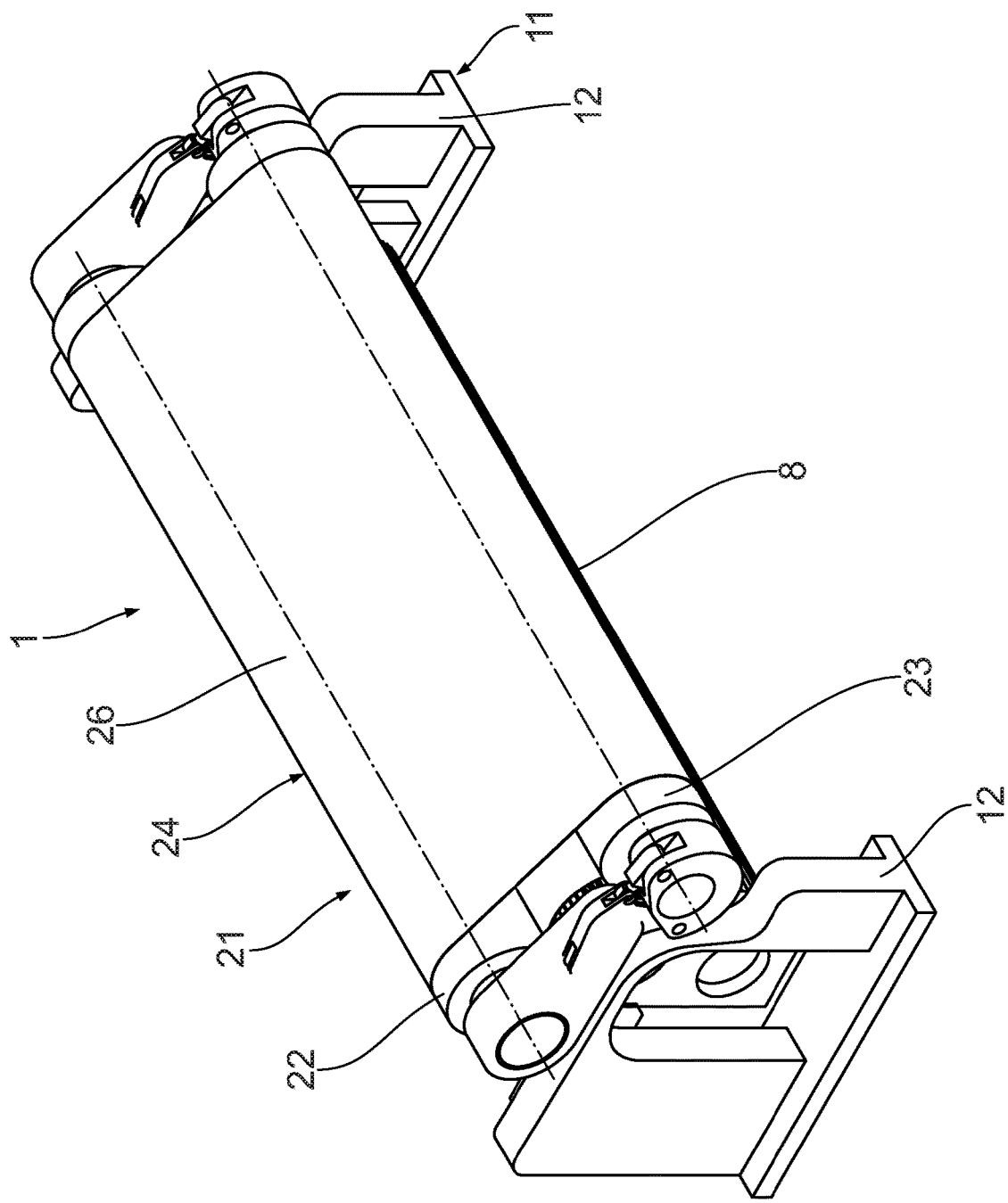
FIG. 1 shows a perspective view of an assembly according to the invention for producing a corrugated cardboard web laminated on one side.
Figure 2:
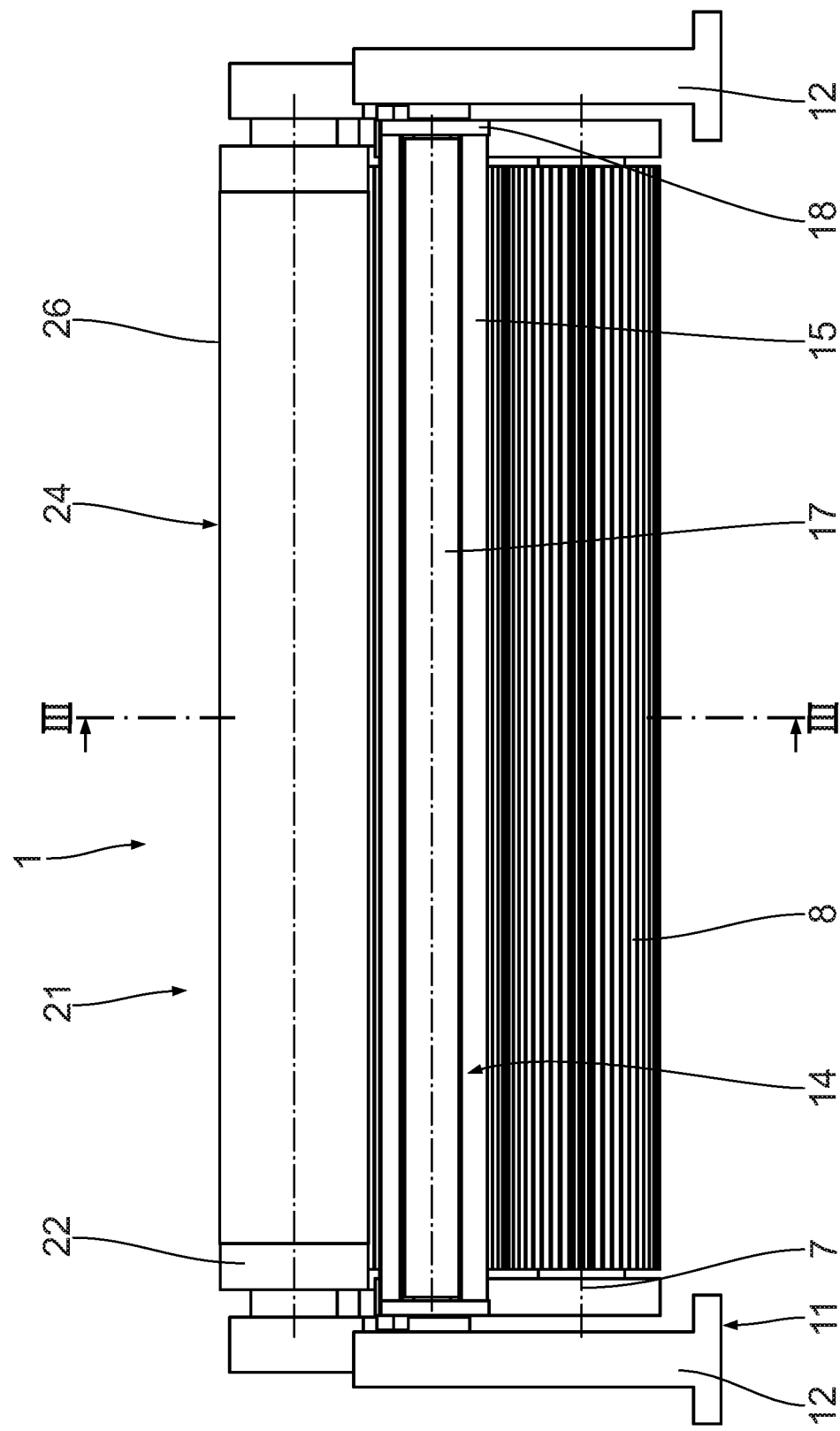
FIG. 2 shows a view of the assembly shown in FIG. 1 for producing a corrugated cardboard web laminated on one side as seen from its glue application device.

An assembly 1 for producing a corrugated cardboard web laminated on one side, which is part of a corrugated cardboard facility (not shown), is shown in its entirety in FIGS. 1 to 3, 8, 9. A cover web 2, in particular an endless cover web, is fed from a cover web unwinding apparatus (not shown) of the corrugated cardboard facility and a material web 3, in particular an endless material web, is fed from a material web unwinding apparatus (not shown) of the corrugated cardboard facility.

The assembly 1 for producing a corrugated cardboard web laminated on one side comprises a first or upper corrugating roller 6 rotatably mounted about a first axis of rotation 5 and a second or lower corrugating roller 8 rotatably mounted about a second axis of rotation 7 for producing a corrugated web 4 (FIG. 3A) having a corrugation from the material web 3. The axes of rotation 5, 7 run parallel to each other and preferably horizontally. They extend perpendicular to a transport direction 9 of the material web 3 or corrugated web 4. The corrugating rollers 6, 8 form a roller nip or corrugating nip 10 for guiding through and corrugating the material web 3.

The assembly 1 for producing a corrugated cardboard web laminated on one side comprises a fixed frame 11. In addition, the frame 11 has two separate stands 12 which are supported against a floor, such as a hall floor.

The two corrugating rollers 6, 8 can be displaced vertically together. For this purpose, the assembly 1 for producing a corrugated cardboard web laminated on one side has a lifting device.

For joining the corrugated web 4 to the cover web 2 to form a corrugated cardboard web 13 laminated on one side, the assembly 1 for producing a corrugated cardboard web laminated on one side has a glue application device 14 downstream of the nip 10 with respect to the material web 3 or corrugated web 4. The glue application device 14 in turn has a glue tray 15, a glue application roller 16 partially arranged in the glue tray 15 and a glue dosing roller 17 associated with the glue application roller 16. The glue application roller 16 is arranged between the first corrugating roller 6 and the glue dosing roller 17. The glue application roller 16 and the glue dosing roller 17 are rotatably mounted in a glue application device housing 18 of the glue application device 14. Alternatively, they are rotatably mounted in side walls of the glue tray 15, for example. Their axes of rotation run parallel to each other and parallel to the axes of rotation 5, 7 of the corrugating rollers 6, 8.

Figure 8:
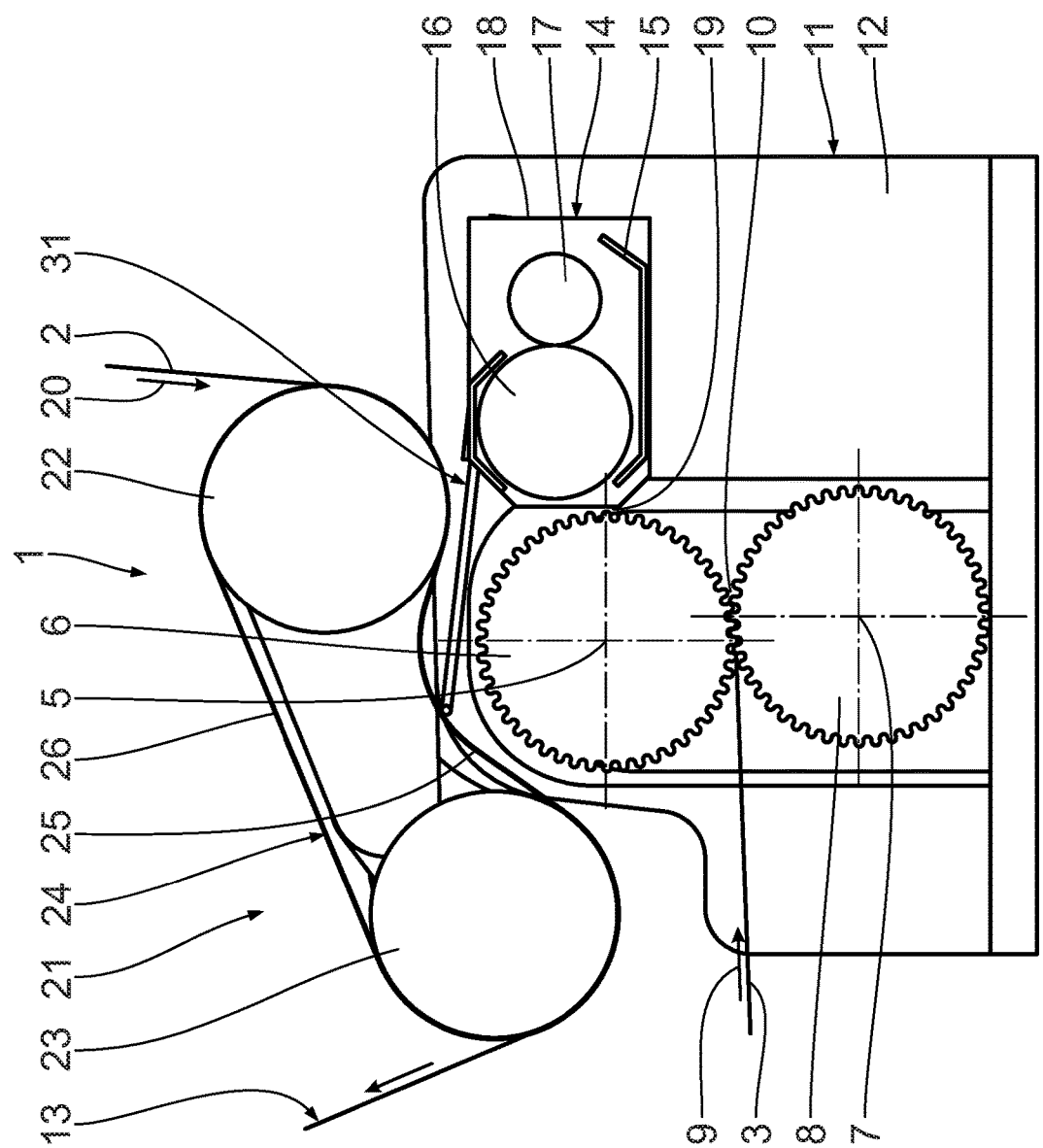
FIG. 8 shows a section according to FIG. 3, wherein the pressure belt engaging device is now in its pressure belt engaging position.

The glue application device 14 can be displaced horizontally in its entirety perpendicular to the first corrugating roller 6 between an active glue application position (FIG. 3) and an inactive corrugating roller change position (FIG. 8).

For passing through and applying glue to the corrugated web 4, the glue application roller 16 forms a gap 19 with the first corrugating roller 6 in its active glue application position, thus forming a glue gap or glue application gap. The glue (not shown) in the glue tray 15 is applied to the free peaks of the corrugation of the corrugated web 4 transported in the transport direction 9 by the rotating glue application roller 16 immersed in the glue. The glue dosing roller 17 is arranged adjacent to, but spaced apart from, the glue application roller 16 and serves to form an even layer of glue on the glue application roller 16. A gap and/or force control can be carried out. In the case of force control, the glue application roller 16 always rests against the corrugated web 4 (with a defined force). In the case of gap control, a gap between the glue application roller 17 and the glue application roller 16 is used to set a glue application. The glue dosing roller 17 is driven in rotation. The glue application roller 16 and the glue dosing roller 17 are driven in rotation by at least one drive belt.

The corrugated web 4 provided with glue is then joined in the assembly 1 for producing a corrugated cardboard web laminated on one side with the cover web 2 transported in a transport direction 20 to obtain the corrugated cardboard web 13 laminated on one side. For pressing the cover web 2 against the corrugated web 4 provided with glue, which rests against the first corrugating roller 6 in certain regions at the top, the assembly 1 for producing a corrugated cardboard web laminated on one side has a pressure belt apparatus 21, which is of modular design. The pressure belt apparatus 21 is arranged downstream of the corrugated web 4 in relation to the glue application device 14 and the nip 10 as well as the gap 19.

The pressure belt apparatus 21 has a first deflection roller 22 and a second deflection roller 23 as well as an endless pressure belt 24 which is guided around the deflection rollers 22, 23 in a circumferential direction. The pressure belt 24 is deflected by the deflection rollers 22, 23. The deflection rollers 22, 23 can be driven in rotation. The second deflection roller 23, for example, can be displaced at an equal distance from the first deflection roller 22. It can also be tilted relative to the first deflection roller 22. The second deflection roller 23 is thus designed as a belt tensioning and belt run regulating roller. A reverse design is possible. The axes of rotation of the deflection rollers 22, 23 run parallel to each other and to the axes of rotation 5, 7 when the second deflection roller 23 is not tilted.

The first deflection roller 22 is arranged above the first corrugating roller 6 or the glue application device 14. The second deflection roller 23 is essentially arranged laterally next to the first corrugating roller 6. It is arranged essentially on a side of the first corrugating roller 6 facing away from the glue application device 14.

The first corrugating roller 6 engages from below in a space between the deflection rollers 22, 23 when the corrugated cardboard web 13 laminated on one side is produced. A lower belt 25 of the pressure belt 24, which can also be referred to as the lower run or lower free section of the pressure belt 24, is deflected by the first corrugating roller 6 and pressed towards an opposite upper belt 26 of the pressure belt 24, which can conversely also be referred to as the upper belt or upper free section of the pressure belt 24. The lower belt 25 and upper belt 26 are (substantially) arranged opposite each other and extend (vertically) spaced apart. They have opposite directions of movement during operation. The lower belt 25 presses with its outer side/underside from the outside or above onto the cover web 2, which is thus in turn pressed from above against the corrugated web 4, which is provided with glue and rests there against the first corrugating roller 6 at the top.

The corrugating rollers 6, 8 are arranged in a corrugating roller cartridge 27 (FIG. 9), which can be displaced, in particular moved, between a corrugating roller operating position and a lateral corrugating roller storage position. In the corrugating roller operating position, the corrugating rollers 6, 8 are in their active corrugating position. In the corrugating roller storage position, they are at a distance from the active corrugating position and outside the assembly 1 for producing a corrugated cardboard web laminated on one side. The corrugating roller cartridge 27 in use up to this point, together with corrugating rollers 6, 8, can thus be replaced by a corresponding new corrugating roller cartridge 28, which can be displaced, in particular moved, accordingly. The new corrugating roller cartridge 28 comprises/carries two correspondingly arranged new corrugating rollers 29, 30, which differ, for example, from the corrugating rollers 6, 8 of the corrugating roller cartridge 27 previously in use, in particular in diameter and/or corrugation. The corrugating rollers 6, 8, 29, 30 are each axially displaceable. In particular, the new corrugating roller cartridge 28 stores the new corrugating rollers 29, 30 which are required for the efficient operation of the assembly 1 for producing a corrugated cardboard web laminated on one side. The corrugating roller cartridges 27, 28 and preferably also further corrugating roller cartridges are favorably accommodated in at least one corrugating roller magazine (not shown).

A pressure belt engaging apparatus 31 is arranged at the glue application device 14. The pressure belt engaging apparatus 31 comprises two displacement devices 32, which are preferably of identical construction and are arranged in pairs. Each displacement device 32 has an outer body 33 which is arranged or mounted laterally on the outside of the glue tray 15, glue tray side walls and/or the glue application device housing 18, for example in a fixed or swiveling manner. Each outer body 33 is designed, for example, in the form of a housing. The glue tray 15, glue tray side walls and/or the glue application device housing 18 is/are arranged between the displacement devices 32 and/or the outer bodies 33.

Each displacement device 32 also has an elongated moving body 34 which can be moved or displaced axially or linearly with respect to the associated outer body 33, in particular guided by the latter. Each moving body 34 is, for example, retractable into and/or extendable from the associated outer body 33. It is, for example, rod-like. The moving bodies 34 are guided out of the side of the respective outer body 33 that is adjacent to or facing the first corrugating roller 6.

The pressure belt engaging apparatus 31 further comprises an engaging rod 35, which is preferably circular in cross-section and extends in a straight manner. The engaging rod 35 runs, for example, parallel to the first axis of rotation 5 or perpendicular to a circumferential or circulating direction of the pressure belt 24. It extends horizontally and is arranged at free ends of the moving bodies 34, which are guided out of the outer bodies 33. The engaging rod 35 runs between the moving bodies 34. It is expedient if the engaging rod 35 can be rotated or driven in rotation about its longitudinal axis.

It is expedient if the pressure belt engaging apparatus 31 can be integrated or is integrated into an actuating unit, in particular a control and/or regulating unit, of the assembly 1 for producing a corrugated cardboard web laminated on one side or of the corrugated cardboard facility.

The operation of the assembly 1 for producing a corrugated cardboard web laminated on one side is explained in more detail below.

Figure 3:
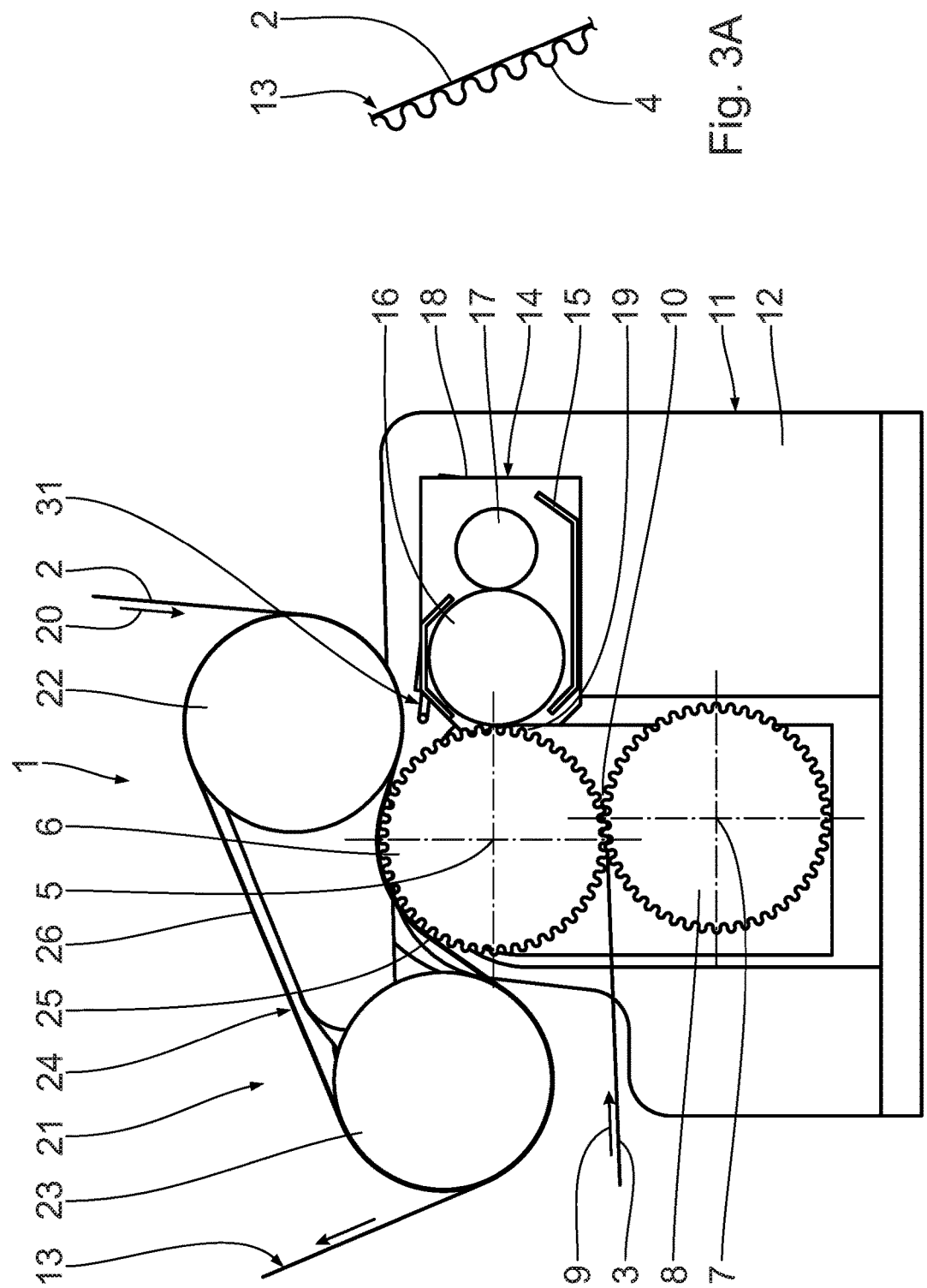
FIG. 3 shows a section through the assembly for producing a corrugated cardboard web laminated on one side according to section line III-III shown in FIG. 2.

For example, as shown in FIG. 3, when the assembly 1 is operating to produce a corrugated cardboard web laminated on one side, the corrugating rollers 6, 8 of the corrugating roller cartridge 27 or set of corrugating rollers currently in use are in their active corrugating position and are capable of producing the corrugated web 4.

The glue application device 14 is in its entirety in an active glue application position, so that the glue application roller 16 is able to apply glue to the corrugated web 4 in a dosed manner.

The lower belt 25 rests on the top of the transported cover web 2 in the region of the first corrugating roller 6 and presses the latter against the glued corrugated web 4 transported there, forming the corrugated cardboard web 13 laminated on one side.

Figure 4:
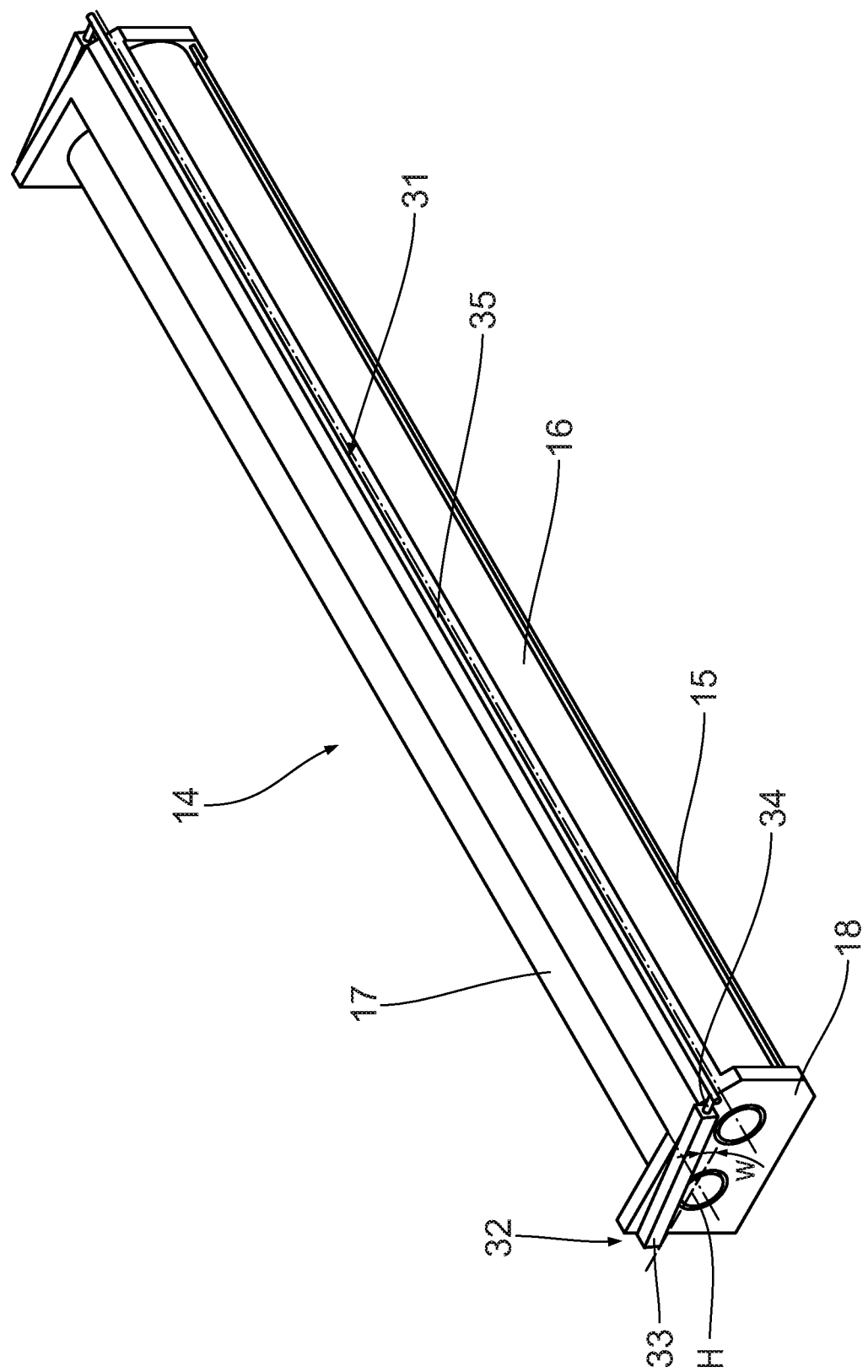
FIG. 4 shows a perspective view of a glue application device of the assembly shown in FIGS. 1 to 3 for producing a corrugated cardboard web laminated on one side, at which the pressure belt engaging apparatus is arranged.
Figure 5:
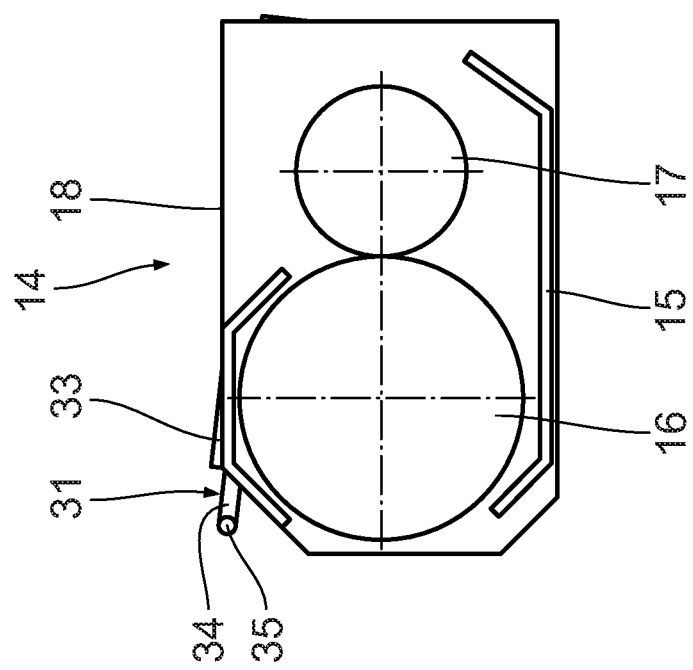
FIG. 5 shows a side view of FIG. 4.

The pressure belt engaging apparatus 31 is in its idle position when the corrugated cardboard web 13 laminated on one side is produced (see also FIGS. 4, 5). The engaging rod 35 is arranged below the first deflection roller 22 and at a distance from the pressure belt 24 therebelow. It is (essentially) arranged laterally next to the first corrugating roller 6 and above the glue application roller 16. The moving bodies 34 are retracted into the outer bodies 33, in particular completely.

A corrugated cardboard web laminated on both sides can be produced in the corrugated cardboard facility from the corrugated cardboard web 13 laminated on one side.

In the following, an exchange of the corrugating roller cartridge 27 that has been in use hitherto by the new corrugating roller cartridge or the new corrugating roller set 28 is described. Preferably, the assembly 1 for producing a corrugated cardboard web laminated on one side is at a standstill.

First, the pressure belt 24 is untensioned. To do this, the second deflection roller 23 is moved consistently in the direction of the first deflection roller 22.

The glue application device 14 is displaced horizontally from the active glue application position away from the first corrugating roller 6 perpendicular to the latter into the inactive corrugating roller change position. At the same time, the pressure belt engaging apparatus 31 is also displaced accordingly. Then the previous corrugating roller cartridge 27 together with the corrugating rollers 6, 8 is lowered or displaced downwards from the corrugating position towards the floor by means of the lifting device.

Figure 6:
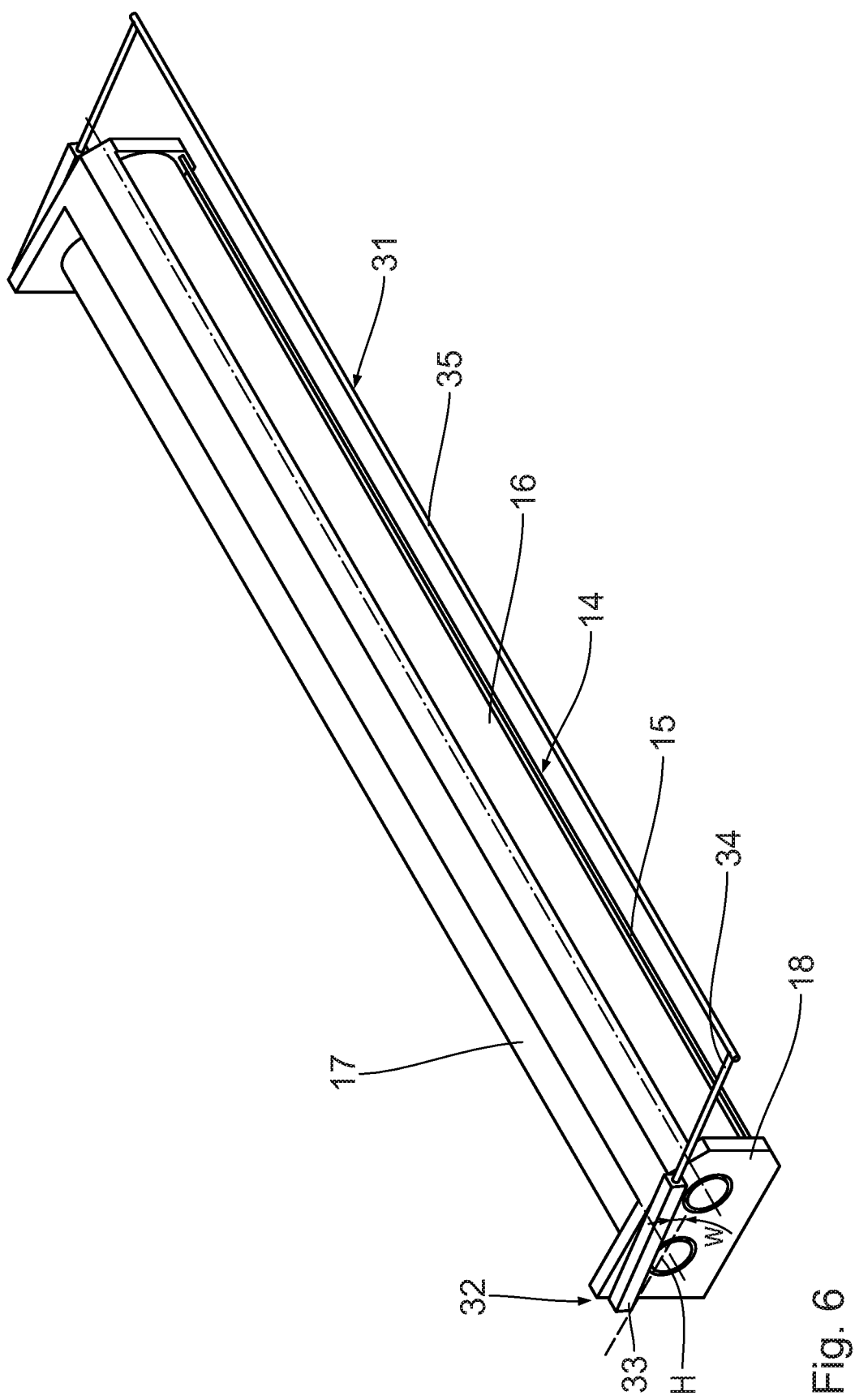
FIG. 6 shows a view corresponding to FIG. 4, wherein the pressure belt engaging device is now in its pressure belt engaging position.
Figure 7:
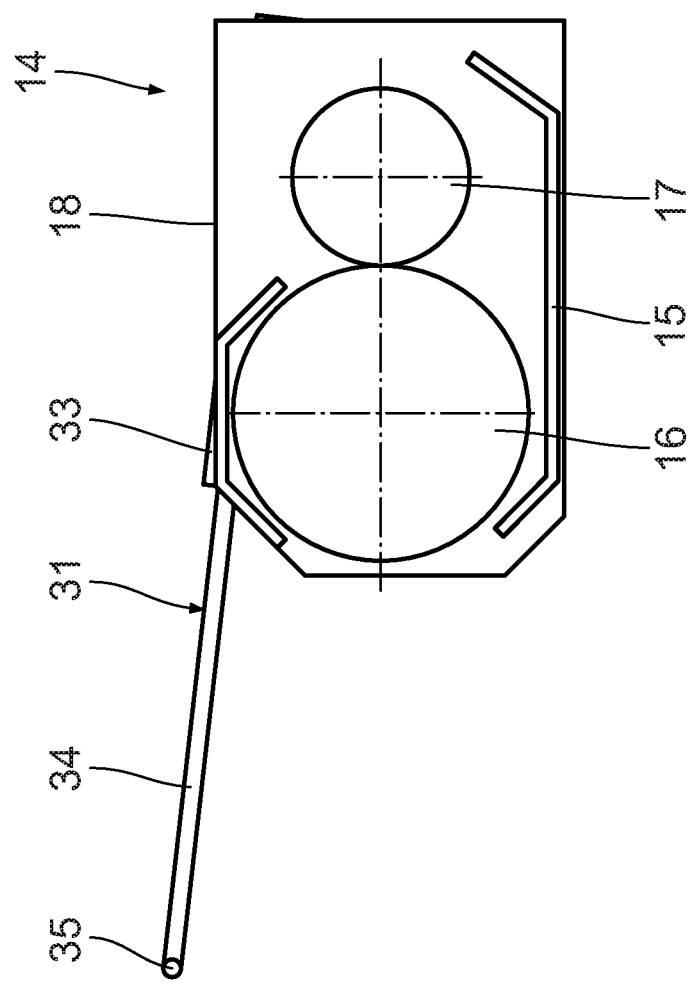
FIG. 7 shows a side view according to FIG. 5, wherein the pressure belt engaging device is now in its pressure belt engaging position.

After the displacement of the corrugating roller cartridge 27 together with the corrugating rollers 6, 8 and/or the displacement of the glue application device 14 or during this process, the moving bodies 34 are extended together consistently, for example completely, from the outer bodies 33 in a linear manner, so that the engaging rod 35 comes into contact from below and outside with the lower belt 25 of the pressure belt 24 between the deflection rollers 22, 23 and thus presses the lower belt 25 upwards in the direction of the upper belt 26 or holds it upwards (see also FIGS. 6, 7, 8). The pressure belt 24 can be tensioned. The engaging rod 35 is moved diagonally upwards above the first corrugating roller 6. It is moved below the first deflection roller 22. The engaging rod 35 is able to rotate about its longitudinal axis during the extension or movement, which can prevent damage to the pressure belt 24. It then engages directly at the bottom of the pressure belt 24 and perpendicular to its circulating direction in a linear manner over the entire width. In particular, it prevents the lower belt 25 from hanging down between the deflection rollers 22, 23. In doing so, the pressure belt 24 is preferably stationary. When the engaging rod 35 is extended, each outer body 33 encloses an angle w, for example a preset angle w, between 2° and 20°, preferably between 4° and 10°, with respect to a horizontal H. It is expedient if the angle w can be adjusted, for example manually and/or by a separate actuator or motor.

Figure 9:
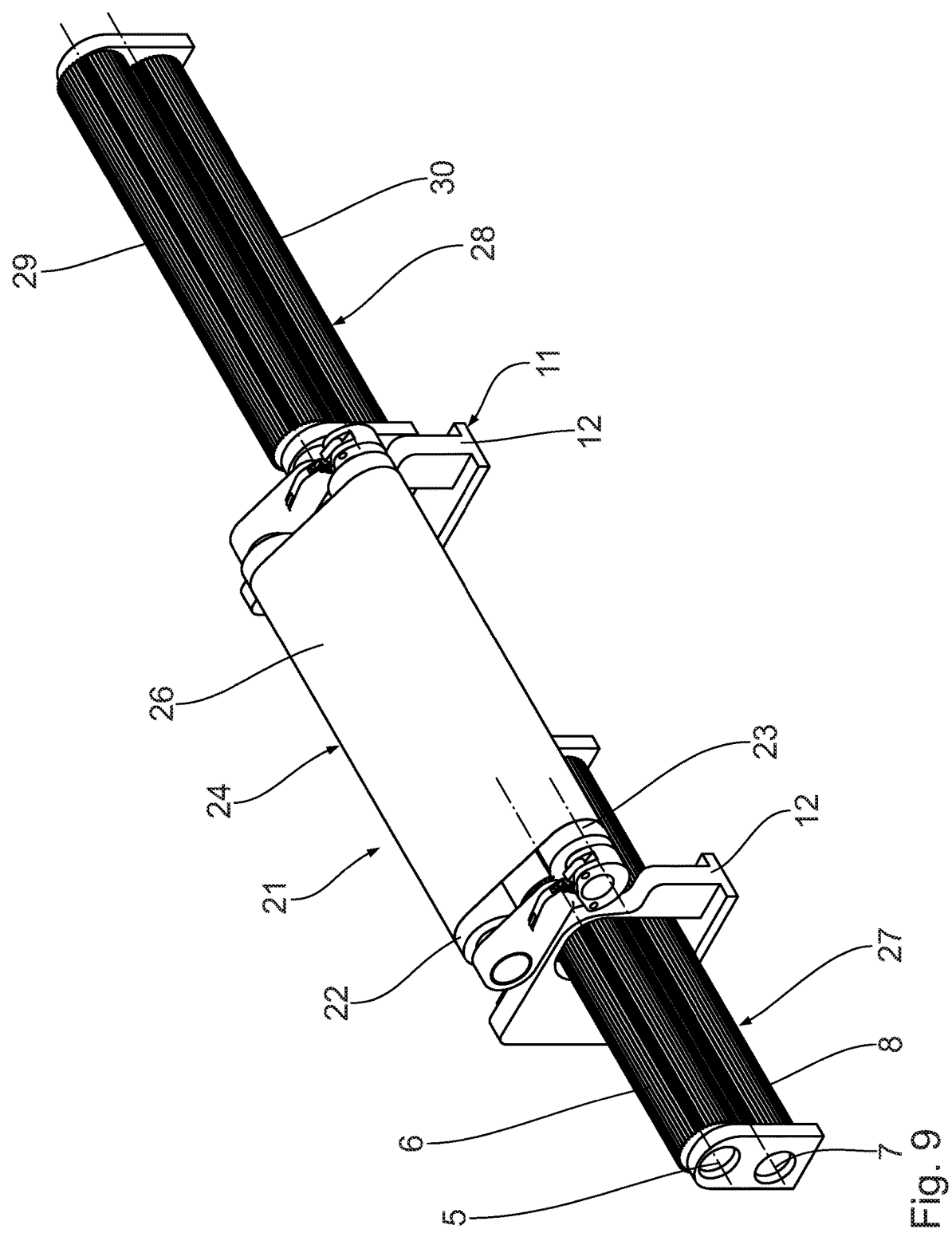
FIG. 9 shows a perspective view which depicts a corrugating roller change in the illustrated assembly for producing a corrugated cardboard web laminated on one side.

Subsequently, the corrugating roller cartridge 27, which has been active up to this point, together with corrugating rollers 6, 8 is moved completely sideways out of the assembly 1 for producing a corrugated cardboard web laminated on one side (FIG. 9). The lower belt 25 is held at a distance from the first corrugating roller 6. The new corrugating roller cartridge 28, together with the corrugating rollers 29, 30, is inserted laterally from the other side into the assembly 1 for producing a corrugated cardboard web laminated on one side. It is moved below the pressure belt apparatus 21.

The engaging rod 35 is again retracted evenly in the reverse direction. It virtually places the pressure belt 24 from above on the new upper corrugating roller 29. The new upper corrugating roller 29 and the lower belt 25 approach each other.

The new corrugating roller cartridge 28 together with the corrugating rollers 29, 30 is displaced upwards into its active corrugating position.

The pressure belt 24 is then tensioned. This is carried out by displacing the second deflection roller 23 consistently away from the first deflection roller 22 and/or by displacing the new corrugating roller cartridge 28 upwards.

The glue application device 14 is again displaced to its active glue application position towards the new upper corrugating roller 29. At the same time, the pressure belt engaging apparatus 31 is also displaced accordingly. In its corrugating position, the new upper corrugating roller 29 then again presses the lower belt 25 upwards towards the upper belt 26.

The material web 9 and the cover web 2 are then fed in again. Corrugated cardboard production can start again.

The pressure belt engaging apparatus 31 makes it possible to eject the corrugating roller cartridge 27 including the corrugating rollers 6, 8 that has been in use hitherto without destroying or damaging the pressure belt 24 in the region of the lower belt 25. Conversely, it is possible to insert the new corrugating roller cartridge 28 together with the corrugating rollers 29, 30 without interfering with or damaging the pressure belt 24 in the region of the lower belt 25.

Figure 10:
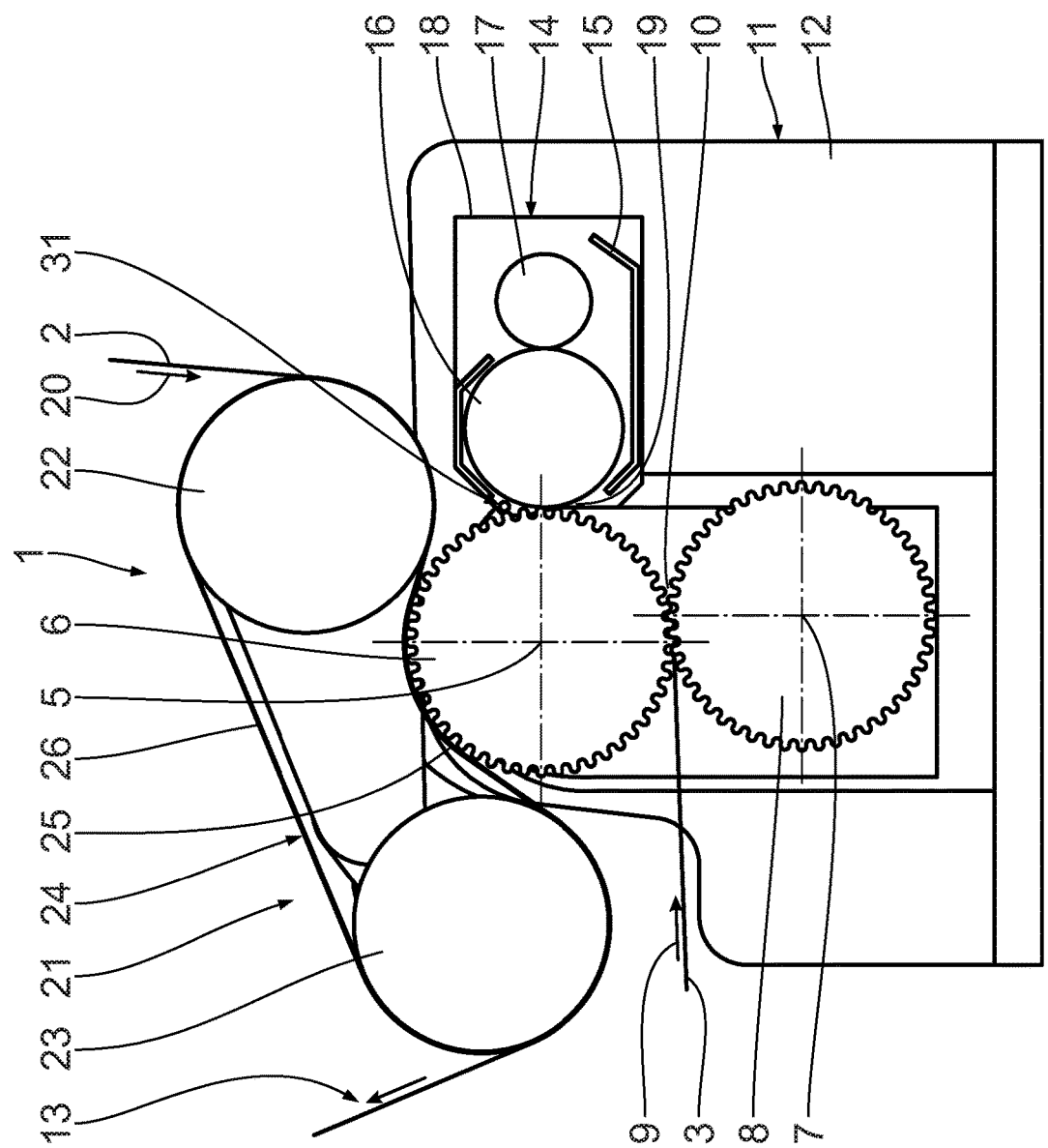
FIG. 10 shows a section according to FIG. 3 which shows an alternative second embodiment of an assembly according to the invention for producing a corrugated cardboard web laminated on one side.
Figure 11:
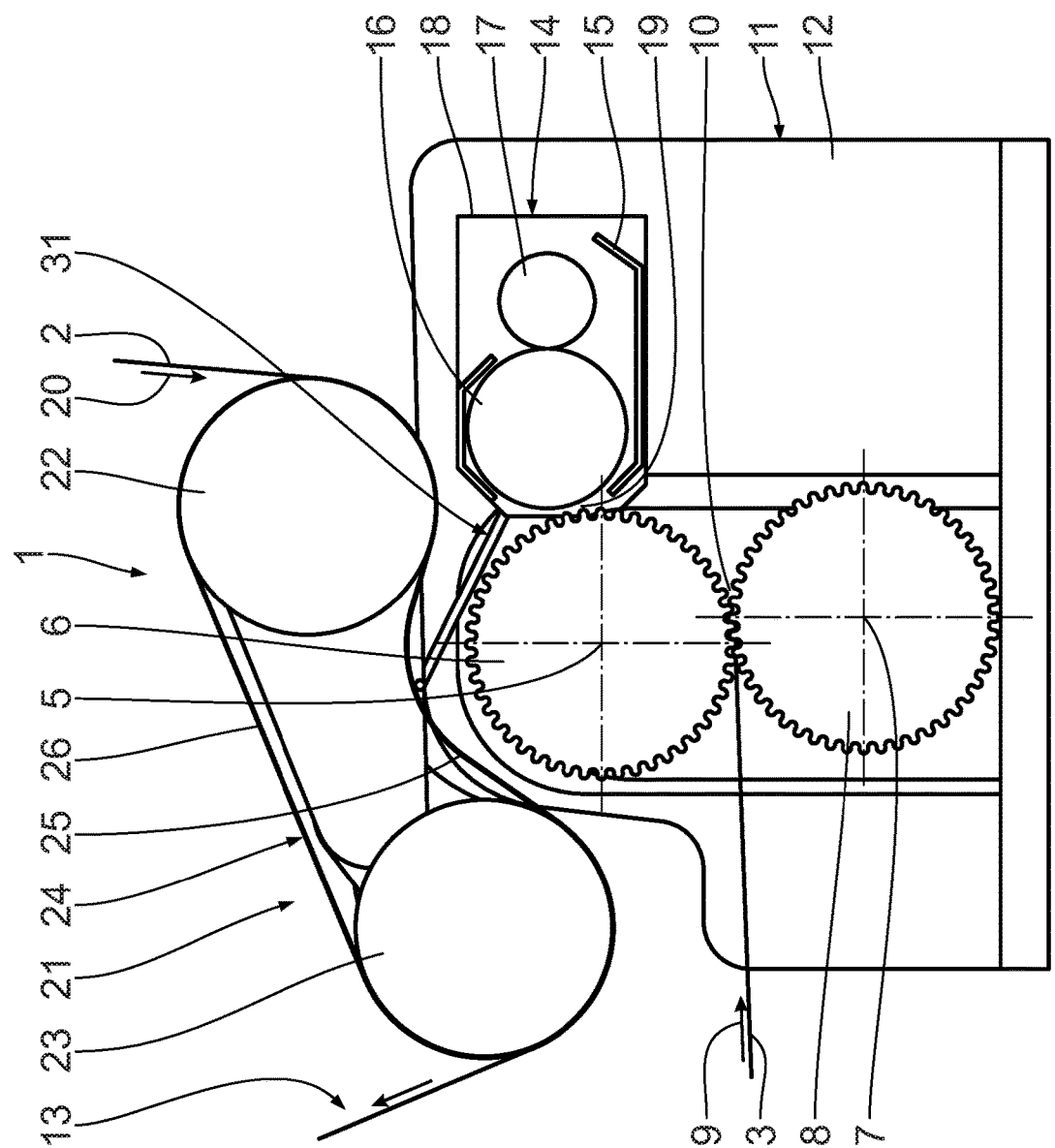
FIG. 11 shows a view according to FIG. 10, wherein the pressure belt engaging device is now in its pressure belt engaging position.
Figure 12:
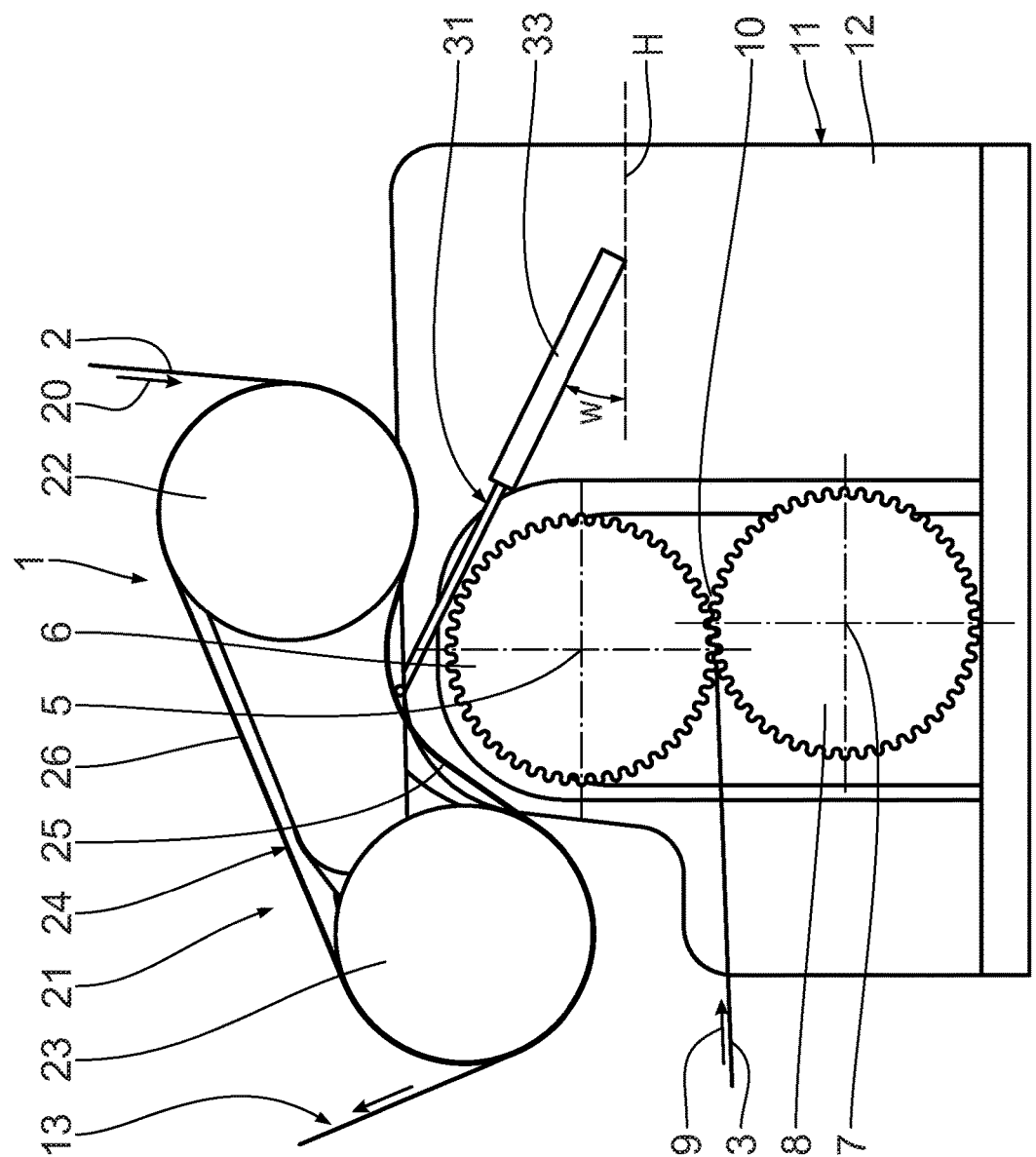
FIG. 12 shows a view according to FIG. 11, wherein for the sake of clarity the glue application device is not represented.

In the following, a second embodiment is described with reference to FIGS. 10 to 12. In comparison with the previous embodiment, the description of which is hereby explicitly referred to, the outer bodies 33 are arranged or mounted, in particular directly, for example on the inside, on the stands 12 of the frame 11 adjacent to the glue application device 14. The outer bodies 33 are thus located between the respective stand 12 and the glue application device 14. They are arranged laterally next to the first corrugating roller 6. In the retracted state, the engaging rod 35 is (substantially) arranged between the first corrugating roller 6 and the glue application roller 16 adjacent above the gap 19. The rod is located below the first deflection roller 22 and is arranged at a distance from the pressure belt 24 (FIG. 10).

When the glue application device 14 is displaced from the active glue application position to the inactive corrugating roller change position, the pressure belt engaging apparatus 31 remains unaffected.

When the moving bodies 34 (FIGS. 11, 12) are extended, the engaging rod 35 is again moved above the first corrugating roller 6 and below the first deflection roller 22 to the lower belt 25 between the deflection rollers 22, 23. The engaging rod 35 is moved diagonally upwards and then engages the lower belt 25 there from below and outside, as in the first embodiment. It pushes the lower belt 25 upwards or holds it there. When the engaging rod 35 is extended, the outer bodies 33 enclose an angle w relative to a horizontal H which is between 10° and 40°, preferably between 15° and 35°, and is preferably adjustable.

After the corrugating roller change, the engaging rod 35 can be retracted evenly in the reverse direction.

Figure 13:
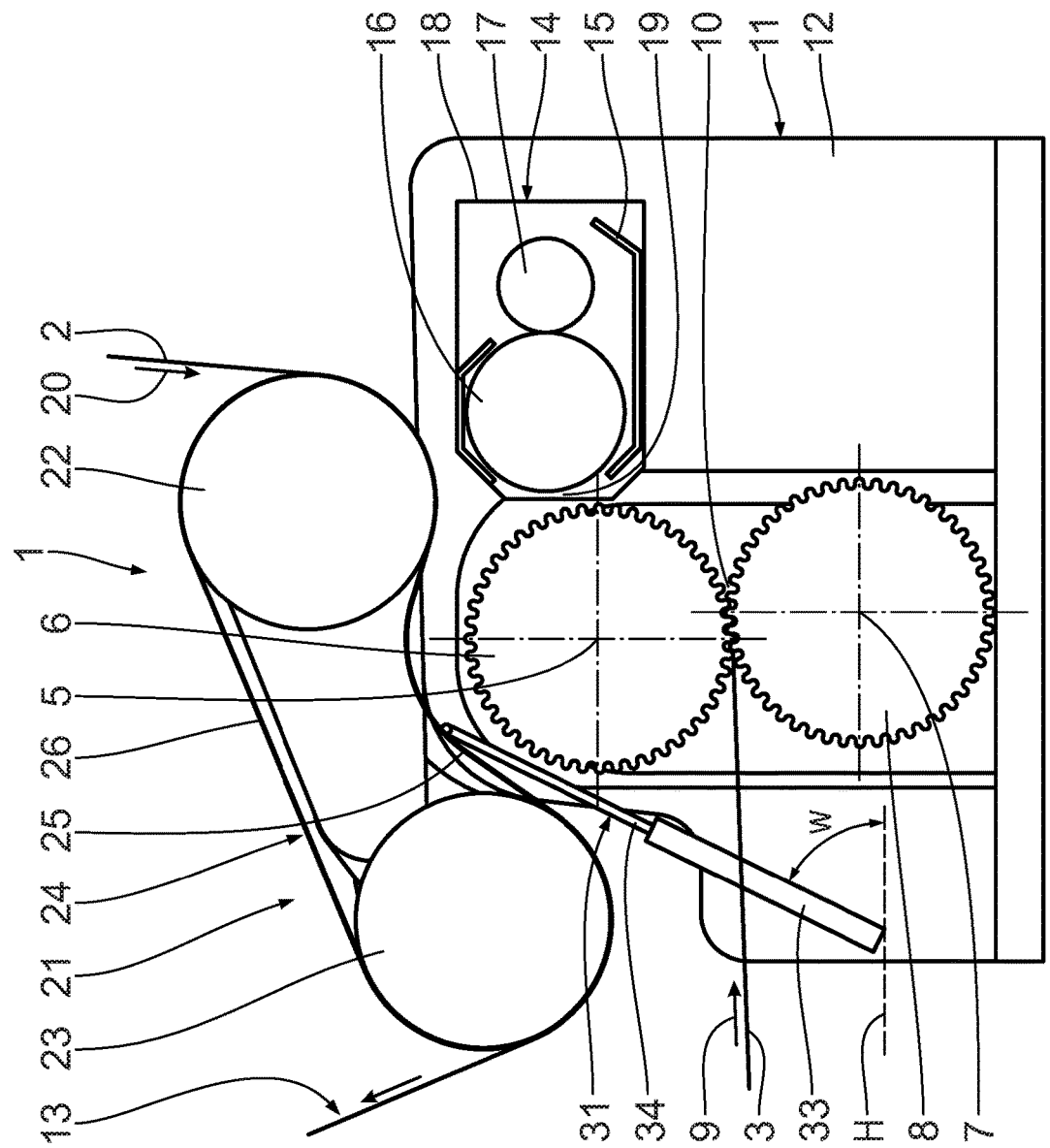
FIG. 13 shows a section according to FIG. 3 which shows an alternative third embodiment of an assembly according to the invention for producing a corrugated cardboard web laminated on one side, wherein the pressure belt engaging device is in its pressure belt engaging position.

In the following, a third embodiment is described with reference to FIG. 13. In comparison with the two previous embodiments, to the description of which explicit reference is made, the outer bodies 33 are arranged or mounted, in particular directly, for example on the inside, on the stands 12 of the frame 11 at the level of the second corrugating roller 8 on a side of the second corrugating roller 8 facing away from the glue application device 14. Each outer body 33 is thus (essentially) arranged below the second deflection roller 23.

When the glue application device 14 is moved from the active glue application position to the inactive corrugating roller change position, the pressure belt engaging apparatus 31 remains unaffected.

During an extension process, the engaging rod 35 is guided past underneath the second deflection roller 23. It is also guided past the first corrugating roller 6. It is moved diagonally upwards. In its engaging position, as in the first embodiment, the engaging rod 35 engages the lower belt 25 of the pressure belt 24 from below on the outside and pushes it upwards or holds it there. When the engaging rod 35 is extended, each outer body 33 encloses an angle w with a horizontal H which is between 50° and 80°, preferably between 55° and 75°, and is preferably adjustable.

After the corrugating roller change, the engaging rod 35 can be evenly retracted again in the reverse direction.

What is claimed is:

1. An assembly for producing a corrugated cardboard web laminated on one side, the assembly comprising:
   a) a first corrugating roller and a second corrugating roller for producing a corrugated web having a corrugation,
   b) a glue application device for applying glue to peaks of the corrugation of the corrugated web,
   c) a pressure belt apparatus, which comprises
      i. a pressure belt for pressing a cover web against the glued peaks of the corrugated web which rests in regions against the first corrugating roller, and
   d) a pressure belt engaging apparatus, which comprises
      i. a pressure belt engaging device which engages the pressure belt during a corrugating roller change to at least one of minimize and eliminate downwardly sagging of the pressure belt at least adjacent to the pressure belt engaging device, and
      ii. at least one displacement device in connection with the pressure belt engaging device to displace the pressure belt engaging device between a pressure belt engaging position and an idle position, wherein the pressure belt engaging apparatus is arranged at the glue application device.

2. The assembly according to claim 1, wherein said at least one displacement device is capable to linearly displace said pressure belt engaging device between said pressure belt engaging position and the idle position.

3. The assembly according to claim 1, wherein the at least one displacement device is designed as linear displacement device.

4. The assembly according to claim 1, wherein the at least one displacement device is variable in its length.

5. The assembly according to claim 1, wherein the pressure belt engaging apparatus is arranged outside the pressure belt apparatus.

6. The assembly according to claim 5, wherein the pressure belt engaging apparatus is arranged completely outside the pressure belt apparatus.

7. The assembly according to claim 1, wherein the pressure belt engaging device in its pressure belt engaging position engages a lower belt of the pressure belt from below.

8. The assembly according to claim 1, wherein during a corrugating roller change at least the first corrugating roller is lowered relative to an active corrugating position.

9. The assembly according to claim 1, wherein at least one glue application roller of the glue application device is displaceable relative to the first corrugating roller and is arranged offset relative to an active glue application position during a corrugating roller change.

10. The assembly according to claim 1, wherein the pressure belt engaging apparatus is arranged at at least one of a glue tray and a glue application device housing of the glue application device.

11. The assembly according to claim 1, wherein the pressure belt engaging device, upon displacement between the pressure belt engaging position and the idle position, describes a displacement trajectory which encloses an angle with respect to a horizontal.

12. The assembly according to claim 11, wherein the angle is adjustable between 2° and 20° with respect to a horizontal.

13. The assembly according to claim 11, wherein the angle is adjustable between 4° and 10° with respect to a horizontal.

14. The assembly according to claim 1, comprising an assembly frame, wherein the pressure belt engaging apparatus is arranged at the assembly frame.

15. The assembly according to claim 14, wherein the pressure belt engaging apparatus is arranged adjacent to the glue application device at the assembly frame.

16. The assembly according to claim 14, wherein the pressure belt engaging apparatus is arranged at second corrugating roller level at the assembly frame.

17. The assembly according to claim 14, wherein the pressure belt engaging apparatus is arranged on a side of the second corrugating roller facing away from the glue application device at the assembly frame.

18. The assembly according to claim 1, comprising a corrugating roller changing apparatus.

19. An assembly for producing a corrugated cardboard web laminated on one side, the assembly comprising:
   a) a first corrugating roller and a second corrugating roller for producing a corrugated web having a corrugation,
   b) a glue application device for applying glue to peaks of the corrugation of the corrugated web,
   c) a pressure belt apparatus, which comprises
      i. a pressure belt for pressing a cover web against the glued peaks of the corrugated web which rests in regions against the first corrugating roller,
   d) a pressure belt engaging apparatus, which comprises
      i. a pressure belt engaging device which engages the pressure belt during a corrugating roller change to at least one of minimize and eliminate downwardly sagging of the pressure belt at least adjacent to the pressure belt engaging device, and
      ii. at least one displacement device in connection with the pressure belt engaging device to displace the pressure belt engaging device between a pressure belt engaging position and an idle position, wherein the pressure belt engaging apparatus, upon displacement between the pressure belt engaging position and the idle position, describes a displacement trajectory which encloses an angle with respect to a horizontal, and
   e) an assembly frame, wherein the pressure belt engaging apparatus is arranged at the assembly frame, wherein the pressure belt engaging apparatus is arranged adjacent to the glue application device at the assembly frame.

20. The assembly according to claim 19, wherein the angle is adjustable between 10° and 40° with respect to a horizontal.

21. The assembly according to claim 19, wherein the angle is adjustable between 15° and 35° with respect to a horizontal.

22. An assembly for producing a corrugated cardboard web laminated on one side, the assembly comprising:
   a) a first corrugating roller and a second corrugating roller for producing a corrugated web having a corrugation,
   b) a glue application device for applying glue to peaks of the corrugation of the corrugated web,
   c) a pressure belt apparatus, which comprises
      i. a pressure belt for pressing a cover web against the glued peaks of the corrugated web which rests in regions against the first corrugating roller,
   d) a pressure belt engaging apparatus, which comprises
      i. a pressure belt engaging device which engages the pressure belt during a corrugating roller change to at least one of minimize and eliminate downwardly sagging of the pressure belt at least adjacent to the pressure belt engaging device, and ii. at least one displacement device in connection with the pressure belt engaging device to displace the pressure belt engaging device between a pressure belt engaging position and an idle position, wherein the pressure belt engaging apparatus, upon displacement between the pressure belt engaging position and the idle position, describes a displacement trajectory which encloses an angle with respect to a horizontal, and e) an assembly frame, wherein the pressure belt engaging apparatus is arranged at the assembly frame, wherein the pressure belt engaging apparatus is arranged at second corrugating roller level at the assembly frame.

23. The assembly according to claim 22, wherein the angle is adjustable between 50° and 80° with respect to a horizontal.

24. The assembly according to claim 22, wherein the angle is adjustable between 55° and 75° with respect to a horizontal.

* * * * *